United States Patent [19]

Gunji et al.

[11] Patent Number: 4,780,778
[45] Date of Patent: Oct. 25, 1988

[54] DEVICE FOR ADJUSTING A SENSOR AT A REFERENCE POSITION CORRESPONDING TO A REFERENCE TRACK POSITION OF A READ/WRITE HEAD

[75] Inventors: Kunihiko Gunji, Tajiri; Yukio Saito; Tadashi Shiraishi, both of Furukawa, all of Japan

[73] Assignee: Alps Electric Co., Ltd., Japan

[21] Appl. No.: 935,103

[22] Filed: Nov. 24, 1986

Related U.S. Application Data

[63] Continuation of Ser. No. 626,309, Jun. 29, 1984, abandoned.

[30] Foreign Application Priority Data

Jun. 29, 1983 [JP] Japan ................................. 58-99334

[51] Int. Cl.$^4$ ..................... G11B 5/56; G11B 21/10
[52] U.S. Cl. ..................... 360/109; 360/77
[58] Field of Search ............ 360/101, 104, 105, 106, 360/107, 109, 77, 74.1, 74.6

[56] References Cited

U.S. PATENT DOCUMENTS

| | | | |
|---|---|---|---|
| 3,064,544 | 12/1977 | Stratton .......................... | 360/107 |
| 3,984,872 | 10/1976 | Beecroft ........................... | 360/105 |
| 3,994,018 | 11/1976 | Kihara et al. .................... | 360/105 |
| 4,052,746 | 10/1977 | Weller ............................... | 360/106 |
| 4,396,959 | 8/1983 | Harrison et al. ................. | 360/77 |
| 4,410,922 | 10/1983 | Babow et al. .................... | 360/109 |
| 4,516,177 | 5/1985 | Moon et al. ...................... | 360/77 |
| 4,524,400 | 6/1985 | Cantwell .......................... | 360/109 |
| 4,566,049 | 1/1986 | Sims, Jr. et al. ................ | 360/109 X |

Primary Examiner—Robert S. Tupper
Assistant Examiner—Andrew L. Sniezek
Attorney, Agent, or Firm—Guy W. Shoup; Paul J. Winters

[57] ABSTRACT

A device for adjusting the position of a sensor corresponding to a predetermined reference track position of a read/write head with respect to a track on a magnetic disk, comprises a chassis, a carriage movably mounted on the chassis and supporting the read/write head, the carriage including a portion to be detected, an adjustment plate supporting a sensor for detecting the portion and having a pivot adjacent to the sensor and by which the adjustment plate is pivotally supported on the carriage, the adjustment plate having an actuating portion in one end thereof remote from the pivot, and a screw adjustably threaded through the adjustment plate into the chassis at a position between the actuating portion and the pivot.

7 Claims, 1 Drawing Sheet

DEVICE FOR ADJUSTING A SENSOR AT A REFERENCE POSITION CORRESPONDING TO A REFERENCE TRACK POSITION OF A READ/WRITE HEAD

This is a continuation application from application Ser. No. 626,309 filed June 29, 1984 now abandoned.

BACKGROUND OF THE INVENTION

The present invention relates to a device for adjusting the position of a sensor corresponding to a predetermined reference track position of a read/write head with respect to tracks on a magnetic disk in a magnetic disk drive mechanism.

Magnetic disks are used in various computer-operated apparatus such as word processors which have found rapid use in recent years. Such apparatus have a magnetic disk drive mechanism including a sensor for detecting the movement of a carriage supporting a read/write head thereon. The sensor detects when the head is positioned at an outermost track on a magnetic disk. Thereafter, with the detected position used as a reference, the head will be moved a desired distance radially of the disk for recording information on or retrieving information from the disk. With such an arrangement, if the head and the sensor have been inaccurately attached in the manufacturing process for the magnetic disk drive mechanism, the sensor tends to detect the carriage in actual operation even when the head is positioned out of alignment with the outermost track on the magnetic disk.

Therefore, it is necessary in the manufacturing process for the magnetic disk drive mechanism to adjust the head and the sensor in their attached positions so that the sensor will detect the carriage in the position in which the head is disposed exactly at the outermost track on the disk. The prior procedure for such positional adjustment has required much skill because of quite small intervals between tracks on magnetic disks. It has therefore been difficult to achieve a high adjustment accuracy with a simple procedure.

SUMMARY OF THE INVENTION

It is an object of the present invention to eliminate the conventional drawbacks by allowing the position of the sensor corresponding to a reference track position of a rear/write head to be positionally adjusted simply and highly accurately with respect to a prerecorded reference track on a reference magnetic disk.

According to the present invention, there is provided a device for adjusting the position of a sensor corresponding to a predetermined reference track position of a read/write head with respect to a track on a magnetic disk, comprises a chassis, a carriage movably mounted on the chassis and supporting the read/write head, the carriage including a portion to be detected, an adjustment plate supporting a sensor for detecting the portion and having a pivot adjacent to the sensor and by which the adjustment plate is pivotally supported on the carriage, the adjustment plate having an actuating portion in one end thereof remote from the pivot, and a screw adjustably threaded through the adjustment plate into the chassis at a position between the actuating portion and the pivot.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Devices for positioning a read/write head at desired data track positions of a magnetic disk are conventionally known and therefore not described herein. Typically, desired data track positions can be located once the reference track position for a read/write head has been set during the manufacturing process. The reference track position is set by fixing the position of a sensor which indicates when the carriage supporting the read/write head is in a position corresponding to the referecene track position. This invention is directed to a device for accurately adjusting the position of the sensor during the manufacturing process so that the reference track position for the read/write head can be precisely set.

Figure 1:
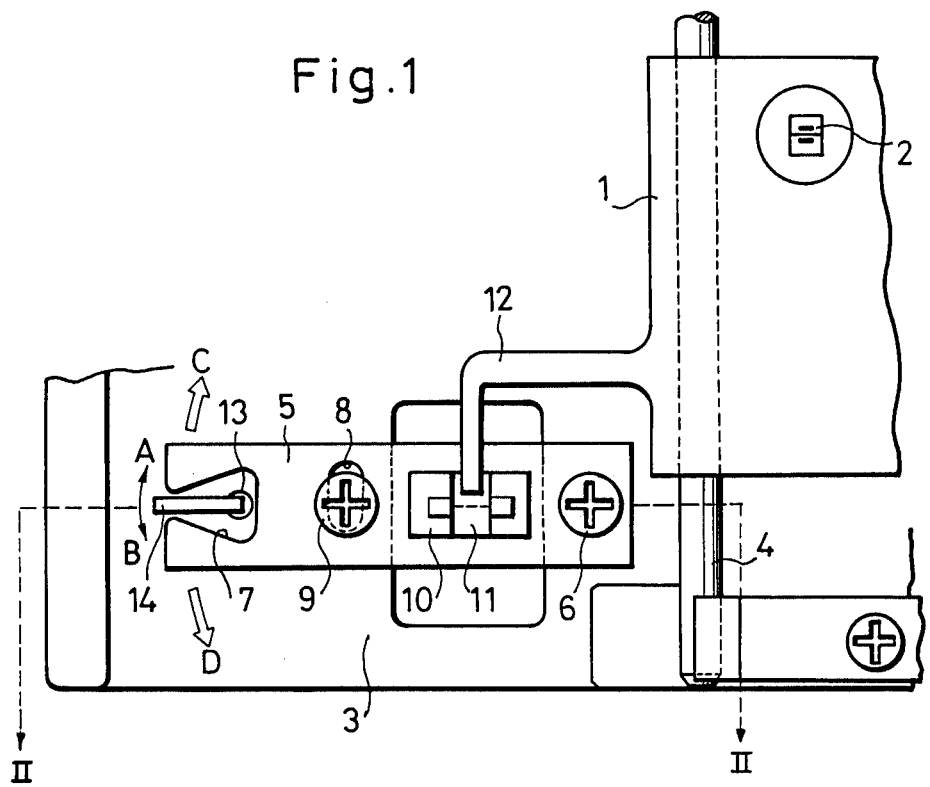
FIG. 1 is a fragmentary plan view of a reference sensor sensor position adjusting device according to the present invention.
Figure 2:
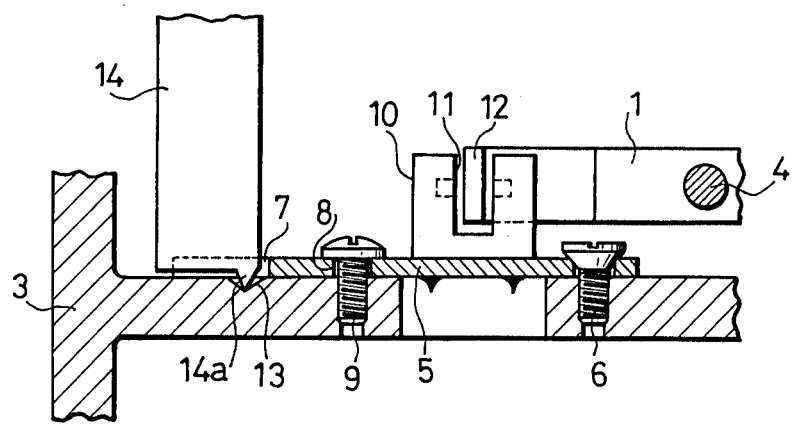
FIG. 2 is a fragmentary cross-sectional view of the reference sensor position adjusting device shown in FIG. 1.

As shown in FIGS. 1 and 2, a carriage 1 supports a read/write head 2 thereon and is slidably movable along a guide shaft 4 secured to a chassis 3. The carriage 1 can be driven by a stepping motor (not shown) to move in a direction to track a magnetic disk. A rectangular adjusting plate 5 has one end pivotally supported on the chassis 3 by a pivot screw 6 with a countersunk head and a substantially triangular actuating recess 7 defined in the other end and having a bottom closer to the screw 6. The rectangular adjusting plate 5 also has a slot 8 defined between the actuating recess 7 and the screw 6 and extending in a direction parallel to the axis of the guide shaft 4. The rectangular adjusting plate 5 is fixed to the chassis 3 by threading an attachment screw 9 through the slot 8 into the chassis 3. A detector body 10 is fixedly mounted on the adjusting plate 5 near the screw 6 and has a central groove 11 across which a sensor composed of a light-emitting diode and a phototransistor (not shown) is disposed in the detector body 10. The carriage 1 has on a rear end thereof a hook-shaped arm 12 to be detected by the sensor, the hood-shaped arm 12 being movable into and out of the groove 11 in response to movement of the carriage 1. The chassis 3 has a conical guide recess 13 defined in an upper surface thereof in positionally corresponding relation to the actuating recess 7 and positioned on a line extending through the screws 6, 9.

Operation for adjusting the position of the head 2 will be described. Positional adjustment of the head 2 is effected by using an adjustment disk (not shown) having a recorded track serving as a positional reference. More specifically, magnetic disks in general have n tracks recorded thereon and identified "00", "01", "02", . . . "n" as numbered radially inwardly. The adjustment disk has its positional reference track located at the outermost "00" track. Therefore, by scanning the reference track on the adjustment disk with the head 2 for playback, the head 2 can be brought into alignment with the "00" track on the adjustment disk. When the head 2 is in the position of the "00" track, the arm 12 enters the groove 11 in the detector body 10 to block off light emitted from the light-emitting diode for thereby energizing the sensor. Accordingly, the head 2 can be determined as positioned at the "00" track when the sensor in the detector body 10 detects the arm 12.

While the head 2 is being aligned with the "00" track using the adjustment disk, the position of the detector body 10 (supporting the sensor) with respect to the arm 12 is accurately adjusted. Such positional adjustment is carried out by an adjustment driver bit 14 having a prong 14a on its end in the following manner: With the screw 9 loosened, the prong 14a is placed in the guide recess 13, and then the adjustment driver bit 14 is turned about the prong 14a in the direction of the arrow A or B in FIG. 1. Rotation of the adjustment driver bit 14 causes the latter to engage and push an edge of the actuating recess 7 so that the adjustment plate 5 will turn about the screw 6 in the direction of the arrow C or D in an angular range determined by abutting engagement of the screw 9 with opposite ends of the slot 8. The adjustment driver bit 14 is turned until the detector body 10 mounted on the adjustment plate 5 is positioned accurately with respect to the arm 12 of the carriage 1. The positional adjustment is completely by finally tightening the screw 9. Since the positional adjustment is performed by turning the actuating recess 7 remote from the screw 6 serving as the turning pivot, the detector body 10 positioned in the vicinity of the screw 6 is angularly disposed through an angular interval smaller than that of the actuating recess 7. As a consequence, the detector body 10 supporting the sensor can be adjustably displaced through small intervals.

While in the foregoing embodiment the arm 12 has been described as being detected by the sensor composed of a light-emitting diode and a phototransistor, the sensor will not be limited to such an arrangement, but may be comprised of a mechanical switch such as a microswitch or a magnetically operated switch. Furthermore, instead of the screw 6 with countersunk head, an eyelet pin, for example, may be used as a pivot for the adjustment plate 5 for supporting the adjustment plate 5 pivotally on the chassis 3 without causing wobbling movement of the adjustment plate 5.

With the foregoing arrangement, the positional relationship between the carriage with the head installed thereon and the sensor for detecting the arm of the carriage can easily be adjusted with high accuracy.

Although a certain preferred embodiment has been shown and described, it should be understood that many changes and modifications may be made therein without departing from the scope of the appended claims.

What is claimed is:

1. A device for adjustingly setting the position of a sensor which indicates when a carriage supporting a read/write head is in a position corresponding to a reference track position of a magnetic disk in a disk drive unit, comprising:
   a chassis;
   a carriage movably mounted on said chassis and supporting the read/write head, said carriage being movable in a radial direction with respect to the magnetic disk so as to move the read/write head between a reference track position and any of a plurality of data track positions corresponding to tracks defined on the magnetic disk, wherein said carriage includes an arm portion having an end which is moved with said carriage in the radial direction between positions corresponding to the reference track position and the data track positions of said carriage;
   an adjustment plate mounted on said chassis and having one end portion as a pivot point pivotably secured to said chassis, an actuating end portion extended opposite from said one end portion in a transverse direction perpendicular to the radial direction which is pivotable for adjusting movement substantially along the radial direction, and a slot formed in said adjustment plate between said two ends extending substantially in the radial direction;
   a sensor mounted between the two ends of said adjustment plate for detecting the end of the arm portion of said carriage when it is in a reference position corresponding to the reference track position, said sensor being movable to adjust its position in the radial direction relative to the end of the arm portion in the reference position in conjunction with the adjusting movement of said actuating end portion of said adjustment plate;
   first securing means for pivotably securing said one end of said adjustment plate as a pivot point to said chassis; and
   second securing means adjustably secured through said slot to said chassis for securing said adjustment plate so as to fix an adjusted position of said sensor at the reference position of the end of the arm portion of said carriage corresponding to the reference track position.

2. A device according to claim 1, wherein said adjustment plate has a detector body mounted thereon and having a central groove, said end of each arm portion being positioned in said central groove, said sensor providing a detection line extending across said central groove.

3. A device according to claim 1, wherein said actuating end portion includes a recess into which a driver lever can be inserted to move said actuating end portion adjustingly by a rotation of said driver lever.

4. A device according to claim 3, wherein said chassis has a recess defined therein in a position corresponding to a center of adjusting movement of said adjusting end portion, whereby said driver lever is positioned in said recess of said actuating end portion and having a prong thereon which can be located in said recess in said chassis for adjusting said adjusting end portion by turning said driver lever about said prong.

5. A device according to claim 4, wherein said recess in said chassis is conical in shape.

6. A device according to claim 4, wherein said recess in said chassis is positioned on a line extending through said pivot and said second securing means.

7. A device according to claim 1, wherein said adjusting plate is mounted to said chassis at said pivot by a screw.

* * * * *

UNITED STATES PATENT AND TRADEMARK OFFICE
CERTIFICATE OF CORRECTION

PATENT NO. : 4,780,778
DATED : October 25, 1988
INVENTOR(S) : Kunihiko Gunji, Yukio Saito, Tadashi Shiraishi It is certified that error appears in the above-identified patent and that said Letters Patent is hereby corrected as shown below:

Claim 2, col. 4; line 39 "each arm" should read --said arm--

Signed and Sealed this

Fourth Day of April, 1989

*Attest:*

DONALD J. QUIGG

*Attesting Officer*   Commissioner of Patents and Trademarks